Dec. 15, 1931.         A. H. DE GROOTE         1,837,021
                         FASTENING DEVICE
                       Filed Dec. 12, 1927
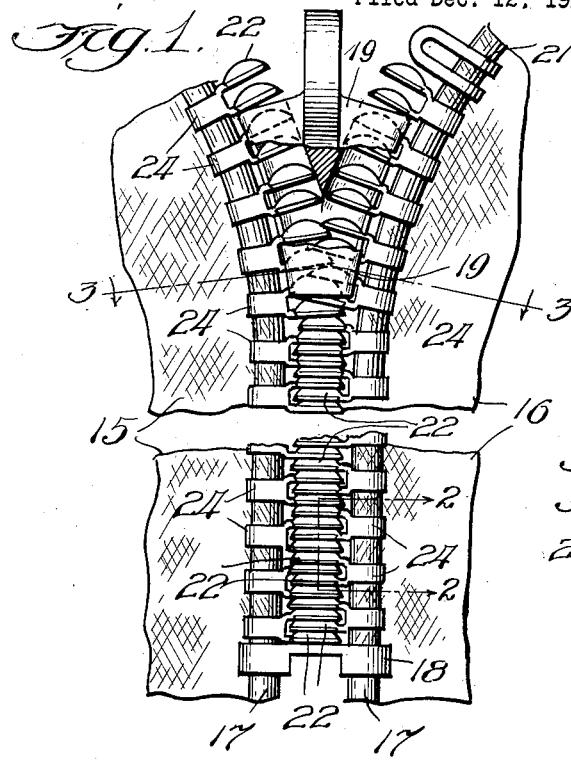
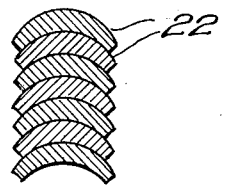
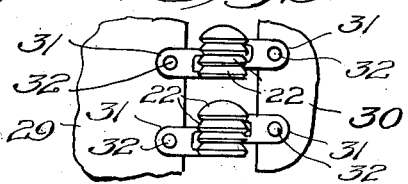
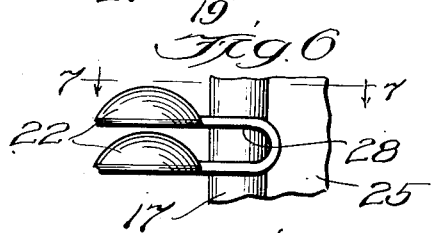
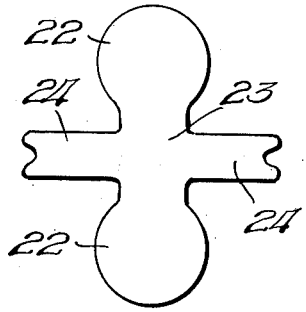
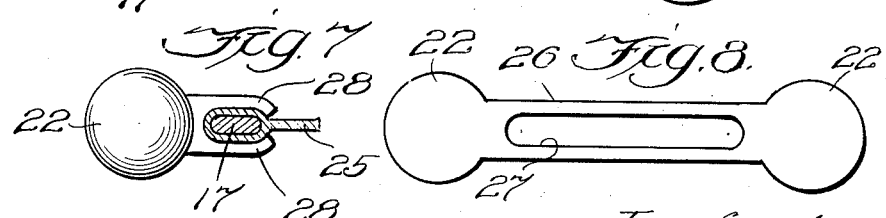
Inventor
August H. De Groote
By Eugene M. Giles
Atty.

Patented Dec. 15, 1931

1,837,021

UNITED STATES PATENT OFFICE

AUGUST H. DE GROOTE, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

FASTENING DEVICE

Application filed December 12, 1927. Serial No. 239,391.

My invention relates to fastening devices of the type wherein opposed series of spaced elements are interlocked and released by movement of a cam member or slider therealong.

In devices of this type in use heretofore, wherein the fastening is accomplished by confining interlocking portions of the elements of the one series between interlocking portions of the elements of the other series, the security of the interlocking depends upon the entire series of interlocked elements being nested together throughout the length of the fastener in a sufficiently compact manner to prevent spreading apart and release of the interlocked elements at any point. In such prior devices accidental release of opposed elements at any point destroyed or interrupted the longitudinal continuity of the compact arrangement and permitted spreading apart and release of the other interlocked elements. With my construction however, the elements are arranged in pairs with the elements of each pair fixed at a suitable distance apart so as to confine and hold the elements of the opposed series therebetween without requiring such longitudinal compactness.

The principal objects of my invention are to provide an improved fastener in which the security of the interlocking is not dependent upon the longitudinal compactness of the series of interlocked elements; to lock elements of one series between rigidly connected elements of the other series; to prevent release of the entire fastener upon disengagement of elements at any point; to form the elements so that they may be entered readily between and interlocked with rigidly connected elements; to provide improved mounting means for the elements; and in general to afford a more secure interlocking arrangement.

On the drawings:

Fig. 1 is a face view of the preferred form of my improved fastening device, partly broken away;

Fig. 2 is an enlarged detail view being substantially a section taken on the line 2—2 of Fig. 1;

Fig. 3 is a horizontal sectional view taken at line 3—3 of Fig. 1;

Fig. 4 is an enlarged detail view, showing one of my improved fastener members comprising two fastening elements, looking at same from the mounting end;

Fig. 5 is a face view of the blank from which the fastener member of Fig. 4 is formed;

Fig. 6 is a side view of a fastener member of slightly different form shown in position upon a stringer;

Fig. 7 is a horizontal sectional view, taken at line 7—7 of Fig. 6;

Fig. 8 is a face view of the blank from which the member of Fig. 6 is formed; and Fig. 9 is a fragmentary side view of another modification of my fastener.

Referring to Figs. 1 to 5 inclusive, to which corresponding parts are indicated by the same characters,—15 and 16 indicate tapes or stringers with corded edges 17 on which the fastener elements are mounted. A connector and stop 18 of any approved type serves to hold the stringers 15 and 16 together at one end of the fastener, as is shown at the bottom portion of Fig. 1.

Each of the stringers 15 and 16 is provided with a series of fastening elements which are adapted by interengagement to detachably connect the two pieces 15 and 16, the fastening elements of one series being brought into operative gripping engagement with the fastening elements of the other series by slight angular movements with respect to each other in the manner well understood in connection with devices of this type. The angling movement of the fastening elements is preferably effected by a slide device 19 of a well understood type, which rides on the outer ends of the fastener elements beyond the tapes or stringers 15 and 16, and has divergent channels meeting in a single channel and through which said channels the fastening elements pass in the operations of interlocking and releasing. A stop device 21 of any approved type is provided at the upper end of each series of elements for limiting the upward movement of the slide 19.

In the construction illustrated in Fig. 1, each of the fastening elements, indicated by the numeral 22, is in the form of a cup substantially rounded on both its inner face and its outer face, as is best shown in Fig. 2. In the construction shown in Fig. 1, each alternate fastening element 22 is connected with the stringer 16, and each other alternate fastening element 22 is connected with the stringer 15, the fastening elements 22 of each series being rigidly connected together in pairs so that the elements of each pair are held rigidly in normal spaced relation to each other.

In the construction illustrated in said Figs. 1 to 5, each of the fastening members comprising a pair of fastening elements 22 is formed integrally by stamping from a single piece of material, the cup like fastening elements 22 being connected together by a strip of material 23 (see Fig. 5), and the device as a whole being secured upon the corded edge 17 by means of arms 24 which are bent over into tight gripping engagement with opposite faces of said edge.

With this construction, when the elements are interlocked by operating the slider 19, one element 22 of each connected pair enters in an angular manner between a connected pair of elements of the other series of fasteners, while the other element of said first mentioned pair enters between the adjacent elements of two adjoining pairs and when the elements are straightened up from their angular engaging movement they are confined between and interlocked with elements of the opposed series. It is to be noted that the space between each pair of connected elements is insufficient to permit direct withdrawal of an element from therebetween but permits the latter to be slid angularly therebetween, and it is to be further noted that the flexing of the tape or stringer upon which the elements are mounted occurs only between the pairs of elements and not between the elements of the pair.

Referring now to Figs. 6, 7 and 8, the construction is seen to be very similar in that it comprises cup-shaped fastening elements 22 secured rigidly together in pairs for mounting in regularly spaced relation upon the corded edge 17 of a piece of material 25. Said edge 17 with either form of fastener may be rounded as shown in Fig. 3 or of an oval form in cross section as shown in Fig. 7. As is best shown in Fig. 8, the fastening elements 22 of the device shown in Figs. 6 and 7 are formed integrally with each other by means of stamping from a single sheet of metal, the fastening elements 22 being connected together by means of a strip 26 which is provided with a long slot 27 therein so as to provide two spaced arms 28 when the fastening elements 22 are brought into the desired spaced relation, each of the arms 28 being in the form of a loop as shown in Fig. 6. The device is secured upon the cord 17 by bending the arms 28 about the cord, as is shown in Fig. 7.

In Fig. 9 I have shown a form in which my fastener may be constructed in view of the fact that the interlocking is not dependent upon the compact or continuous nesting of the entire series of elements. In said figure connected pairs of elements 22 are employed with the pairs of elements spaced apart on each stringer, leaving an intervening space between each group of interlocked elements, each group, in the illustrated structure, being composed of a pair of connected elements 22 on the one stringer 29 and a pair of connected elements 22 on the other stringer 30, which nest together and interlock as shown.

The fastener elements may be mounted on the stringers as hereinbefore indicated or in other convenient manner, for example as shown in Fig. 9, wherein ears 31 engage the edge of the tape or stringer 29 or 30 therebetween and are secured thereto by a rivet 32 or other suitable means.

While I have shown and described my invention in a preferred form, I am aware that various changes and modifications may be made without departing from the principles of my invention, the scope of which is to be determined by the appended claims.

I claim as my invention:

1. In a fastening device of the class described, the combination of opposed series of fastener elements each having a recess and a projection engaging respectively with a projection and a recess of the opposed elements and a slider operable therealong for interlocking and releasing same, said elements of one series being adapted to be brought into gripping engagement between elements of the other series, and means connecting fastening elements of each series rigidly together in pairs.

2. A fastening device of the class described, comprising in combination a series of fastening elements in spaced relation to each other, a second series of fastening elements similar to said first named elements and each having a recess and a projection engaging respectively with a projection and a recess of the opposed elements, said elements being also arranged in spaced relation to each other and adapted by slight angular movements in succession to be brought into gripping engagement with the elements of said first named series, and said fastening elements of one series being rigidly connected together in pairs for causing them to grip the interposed element of the other series independently of the remaining fastening elements.

3. A fastening device of the class described, comprising a series of fastening elements in substantially regularly spaced relation to each other, a second series of fastening elements in substantially the same regularly spaced relation to each other and adapted by slight angular movements in succession to be brought into gripping engagement with the elements of said first named series, each having a recess and a projection engaging respectively with a projection and a recess of the opposed elements and said fastening elements of one series being rigidly connected together in pairs.

4. A fastening device of the class described, comprising in combination a series of fastening elements in substantially regularly spaced relation to each other, a second series of fastening elements in substantially the same regularly spaced relation to each other and adapted by slight angular movements in succession to be brought into interlapping engagement with said first named fastening elements with one fastening element of each series interposed between each two adjacent fastening elements of the other series and with each element of each series interlocking with both of the elements of the other series between which it is interposed, and means connecting the fastening elements of each series rigidly together in pairs.

5. A fastening device of the class described, comprising in combination a series of fastening elements in substantially regularly spaced relation to each other and each having a recess in one side and a projection on the other side, a second series of fastening elements similar to said first named fastening elements and also arranged in substantially the same regularly spaced relation to each other and adapted by slight angular movements in succession to be brought into interlapping engagement with said first named fastening elements with one fastening element of each series interposed between each two adjacent fastening elements of the other series and with each fastening element of each series interlocking with both of the fastening elements of the other series between which it is interposed, and means connecting the fastening elements of each series rigidly together in pairs.

6. A fastening device of the class described, comprising in combination a series of fastening elements in substantially regularly spaced relation to each other and each in the form of a cup substantially rounded both inside and outside, a second series of fastening elements similar to said first named fastening elements and also arranged in substantially the same regularly spaced relation to each other and adapted by slight angular movements in succession to be brought into interlapping engagement with said first named fastening elements with one fastening element of each series interposed between each two adjacent fastening elements of the other series and with each fastening element of each series interlocking with both of the fastening elements of the other series between which it is interposed, means connecting the fastening elements of each series rigidly together in pairs, and means serving by a movement longitudinally of the fastening device to give each of said connected pairs of fastening elements in turn a relative movement with respect to the oppositely disposed elements of the other series for bringing said elements into operative interlocking engagement with each other.

AUGUST H. DE GROOTE.